United States Patent [19]

Eggebrecht et al.

[11] Patent Number: 4,495,594

[45] Date of Patent: Jan. 22, 1985

[54] SYNCHRONIZATION OF CRT CONTROLLER CHIPS

[75] Inventors: Lewis C. Eggebrecht, Rochester, Minn.; David A. Kummer, Boca Raton; Jesus A. Saenz, Coral Springs, both of Fla.

[73] Assignee: International Business Machines Corporation, Armonk, N.Y.

[21] Appl. No.: 279,368

[22] Filed: Jul. 1, 1981

[51] Int. Cl.³ .............................................. G06F 3/14

[52] U.S. Cl. .................................. 364/900; 364/521; 340/723

[58] Field of Search ... 364/200 MS File, 900 MS File, 364/521; 340/709, 717, 731, 723, 720

[56] References Cited

U.S. PATENT DOCUMENTS

| | | | |
|---|---|---|---|
| 3,996,584 | 12/1976 | Plager | 340/324 AD |
| 3,996,585 | 12/1976 | Hogan et al. | 364/900 |
| 4,020,472 | 4/1977 | Bennett et al. | 340/172.5 |
| 4,099,236 | 7/1978 | Goodman | 364/200 |
| 4,140,873 | 2/1979 | Kinch, Jr. et al. | 178/22 |
| 4,183,089 | 1/1980 | Daughton et al. | 364/900 |
| 4,197,590 | 4/1980 | Sukonick et al. | 364/900 |
| 4,386,410 | 5/1983 | Pandya et al. | 364/518 |
| 4,393,377 | 7/1983 | Couper et al. | 340/731 |

*Primary Examiner*—James D. Thomas
*Assistant Examiner*—A. E. Williams, Jr.
*Attorney, Agent, or Firm*—R. Bruce Brodie

[57] ABSTRACT

Two controller units controlling a single input/output device such as a cathode ray tube (CRT) are synchronized by a command signal. Upon appearance of the command signal, the slave controller unit, which may have been running unsynchronized with the master controller, is stopped at the time for vertical retrace and remains stopped until vertical retrace time for the master controller. At this point, the slave controller is restarted in synchronism with the master controller and remains synchronized so long as both master and slave receive the same clock and the same screen refresh parameters.

2 Claims, 4 Drawing Figures

SYNCHRONIZATION OF CRT CONTROLLER CHIPS

BACKGROUND OF THE INVENTION

1. Field of the Invention

This invention relates to control circuits for output devices and relates more particularly to circuits for maintaining synchronization between two or more controllers of output devices.

2. Description of Prior Art

It may be desirable in the control of an input/output device, such as a cathode ray tube (CRT) display, to provide more control function than is available from a single commercially available CRT controller chip. In this situation, one or more additional CRT controller chips can be employed to provide the additional control function, provided that the controller chips are properly synchronized with each other.

PRIOR ART

U.S. Pat. No. 3,996,584 shows a display which can be fed by two character generators, such that foreign languages can be displayed. This system operates by including a character generator control which selects one or the other of the two character generators, and this is distinguished since both do not operate simultaneously.

U.S. Pat. No. 4,020,472 shows a plurality of controllers which respond to signals from a single processor, and control individual I/O units. However, in this reference no synchronization between the two controllers is necessary since they feed different display units.

SUMMARY OF THE INVENTION

In accordance with the present invention, one or more auxiliary or slave CRT controllers connected to a common CRT are synchronized to a master controller so that they remain in synchronism so long as they are programmed with the same screen refresh parameters. This is accomplished by generating a synchronizing signal and then allowing the unsynchronized slave controller or controllers to run until they reach their vertical retrace time, at which time the character clock for the auxiliary or slave controller is stopped, thereby freezing the slave controllers in that state. When the master clock reaches its vertical retrace time, the character clock to the slave controllers is restarted and the master and slave controllers thereafter run in synchronism.

DESCRIPTION OF THE PREFERRED EMBODIMENT

Figure 1:
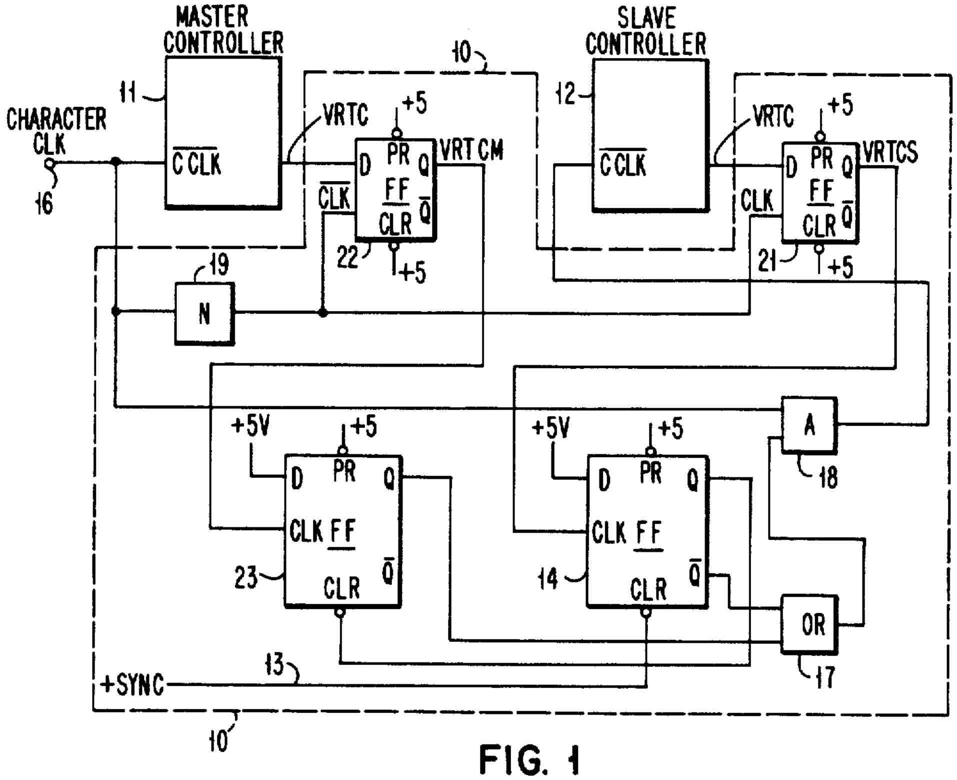
FIG. 1 is a diagram showing synchronizing circuitry for carrying out the present invention.

The synchronizing circuitry of the present invention is shown in the dotted enclosure 10 in FIG. 1 in connection with a pair of CRT controllers 11, 12 which control a single CRT (not shown). Controllers 11, 12 may be of any suitable type, such as chip CRT controllers manufactured by Intel Corporation under the designation of Type 8275. Controller 11 is designated as the master and controller 12 is identified as the slave controller. A synchronizing command signal to perform synchronization of the two controllers in accordance with the present invention may be generated by a central processing unit (CPU) and appears on a line 13 as the "clear" input to a flip-flop 14.

Pre-Sync Signal

Prior to receipt of this sync pulse, controllers 11, 12 may be operating in an unsynchronized mode under control of a character clock input on terminal 16. With sync line 13 having a zero, and flip-flop 14 therefore having a zero on its "clear" input, output Q of flip-flop 14 is zero and output $\overline{Q}$ is one. The Q output of flip-flop 14 is also supplied to the "clear" input of a flip-flop 23, causing the Q output of this flip-flop which is supplied as the other input to OR gate 17 to become zero. The output from $\overline{Q}$ of flip-flop 14 passes through OR gate 17 and is supplied as an input to an AND gate 18. The other input to gate 18 is a character clock signal from terminal 16. Under these conditions, the clock signals pass through gate 18 to the $\overline{CCLK}$ input of controller 12.

Post Sync

When the sync signal goes to a one on line 13, this removes the "clear" on flip-flop 14. Slave controller 12 continues to run until time for its vertical retrace, at which time the output line VRTC in controller 12 is raised and supplied through a flip-flop 21 which acts to synchronize the pulse to the character clock. This causes the Q output of flip-flop 21 to become a one, which is supplied as a clock input to flip-flop 14, causing flip-flop 14 to change state so that Q is a one and $\overline{Q}$ is a zero. Hence, under these conditions, there are no inputs to OR gate 17. This removes an enabling input from gate 18 which had been provided through OR gate 17, so that the character clock pulses can no longer pass through gate 18 to controller 12.

At this point the slave controller 12 is effectively frozen in that state with its character clock stopped. Also, at this time the Q output of flip-flop 14 is supplied to remove the "clear" input of flip-flop 23.

Post Sync-VRTCM

When master controller 11 reaches its vertical retrace time, its output line VRTC rises and is transmitted through synchronizing flip-flop 22 to the clock input of flip-flop 23. This causes the Q output of flip-flop 23 to become a one and this output is passed through OR gate 17 to gate 18, thereby allowing the character clock pulses through gate 18 to slave controller 12. Controllers 11, 12 are now synchronized and since they have the same character clock and the same screen parameters, they will remain synchronized with each other so long as the sync input on line 13 remains high.

A summary of the status of the different flip-flops during the operation is shown in the table below.

| Flip-Flop | Pre-Sync | Post Sync at VRTCS | Post Sync VRTCM |
|---|---|---|---|
| 14-Q | 0 | 1 | 1 |
| 14-Q | 1 | 0 | 0 |
| 23-Q | 0 | 0 | 1 |

Figure 2:
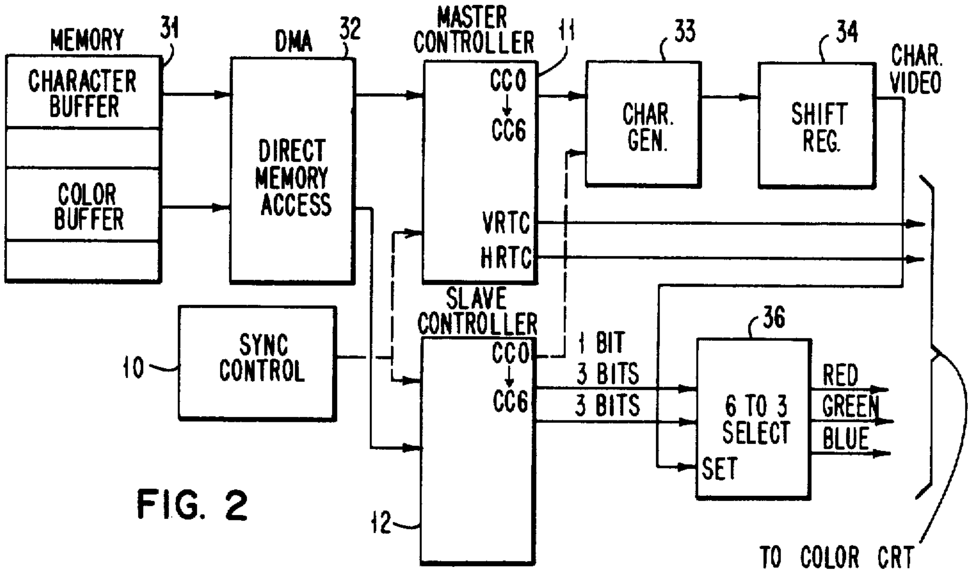
FIGS. 2–4 show different applications of the synchronizing circuitry of FIG. 1 to the control of a single CRT.

FIG. 2 illustrates an application of the synchronizing circuitry 10 of the present invention to two CRT controllers which share control of the characters and color on a single CRT. The character information is supplied in the character buffer section of a memory 31 and the corresponding color attribute information for each character is stored in the color buffer section of memory 31. The character information from memory 31 is supplied through a direct memory access device (DMA) 32 to master controller 11. The 7 bit output of master controller 11 is supplied as character address information to a character generator circuit 33. The output of generator 33 is fed through a shift register 34 to form the character video signal to a character and color defining circuit 36.

The color information from memory 31 is supplied through DMA 32 to the input of slave controller 12. Three of the output lines of slave controller 12 convey information relative to character background color and three other output lines convey informtion relative to character foreground color. The six lines are supplied to circuitry 36 which performs a six-to-three select operation to produce appropriate signals on its red, green and blue output lines. This information, together with the vertical and horizontal retrace signals, are sent to the color CRT (not shown).

One feature of the embodiment of FIG. 2 is that the seventh bit in the output of slave controller 12, which is not required for color definition, can be supplied as shown to master controller 11. This results in the availability of 8 bits in controller 11 for character addressing, thus supporting character code sizes greater than seven bits, such as EBCDIC.

It will be understood that in the embodiment of FIG. 2, synchronization control circuitry 10 operates as described above in connection with FIG. 1 to produce synchronization of controllers 11 and 12 when the sync line is raised by the CPU.

Figure 3:
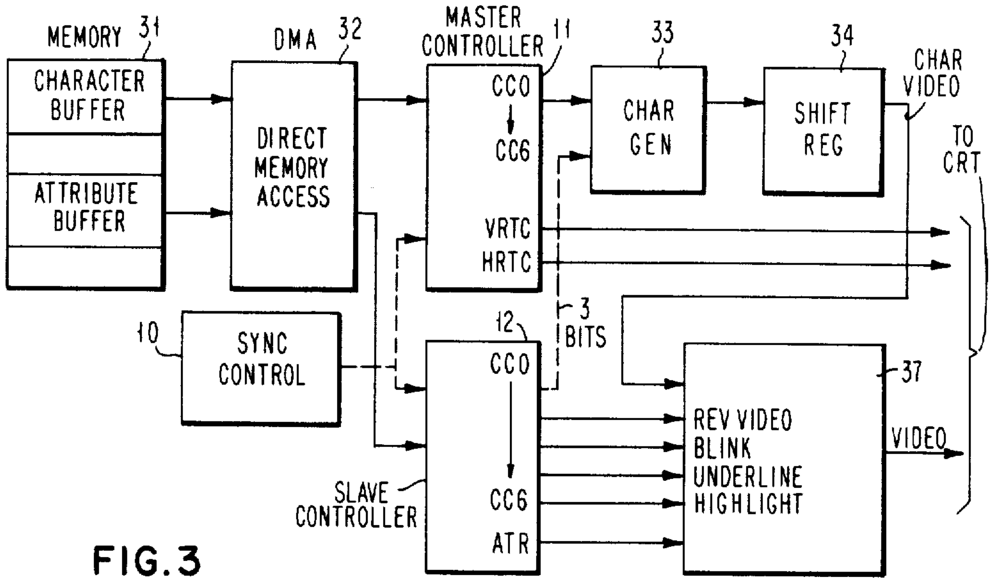

FIG. 3 illustrates another application of the present invention in connection with attribute information relative to displayed characters. In FIG. 3, memory 31 again holds character information which is supplied through DMA 32 to master controller 11. As before, the seven output bits are supplied as character address information to character generator 33 whose output is supplied through shift register 34 to form the character video input signal which is supplied to character attribute circuitry 37.

Another section of memory 31 contains attribute information about each character and this information is supplied through DMA 32 to slave controller 12. In the example illustrated, the attributes are assumed to be reverse video, blink, underline and highlight. Hence, four of the output lines from slave controller 12 are supplied to circuitry 37 with this attribute information for each character. The output from circuitry 37 is supplied as the video signal to a CRT (not shown), along with the vertical and horizontal retrace signals.

The output bits of controller 12 which are not used to convey attribute information are supplied as inputs to character generator 33, thereby resulting in the availability of ten bits for character addressing. As in the embodiment of FIG. 2, the synchronization control circuitry 10 operates to synchronize slave controller 12 with master controller 11 when the CPU raises the sync line.

Figure 4:
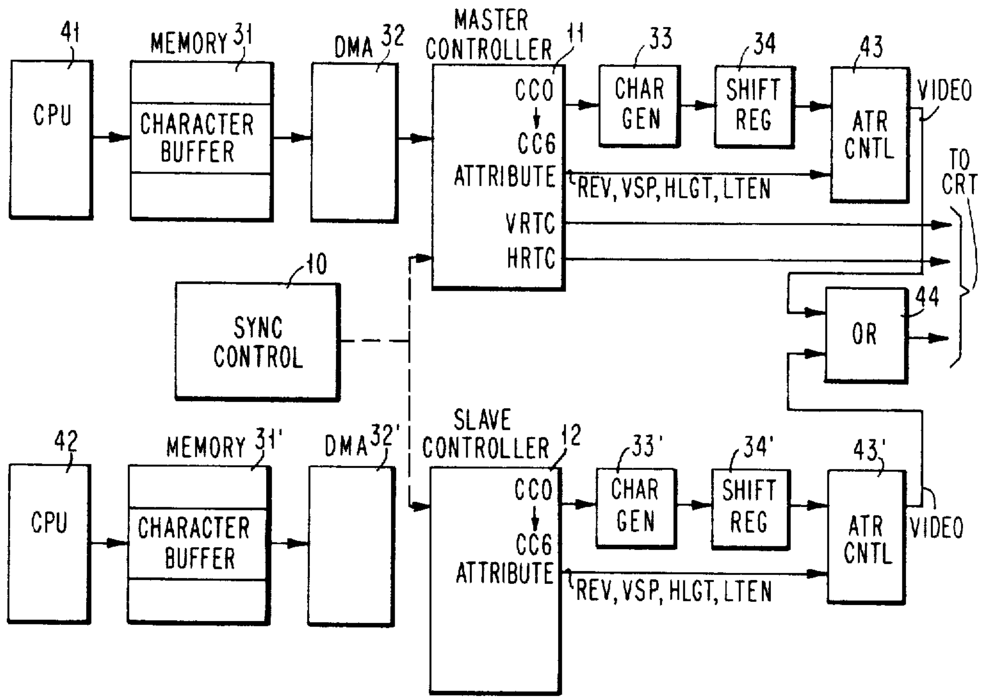

FIG. 4 illustrates another application of the present invention which allows more than one CPU to display data on a single CRT. Two CPU's 41, 42, are shown, although a larger number may be employed, provided the appropriate number of controllers are used. CPU 41 supplies information to the character buffer portion of memory 31 which is sent to master controller 11 through DMA 32. The output of controller 11 is supplied as before to character generator 33 whose output is supplied through shift register 34 to attribute control circuitry (ATR) 43. The output of this circuitry is supplied as the video signal to an OR gate 44 whose output is sent to the CRT (not shown).

CPU 42 controls the character buffer section of memory 31' to send character information through DMA 32' to slave controller 12. The output of slave controller 12 is sent through character generator 33' to shift register 34' whose output is supplied to ATR control circuitry 43'. The video output signal is sent as another input to OR gate 44.

An embodiment similar to that shown in FIG. 4 allows up to N processors to display data on a single CRT screen. This can be used for split screen multiwork stations or to permit two or more processors in a control application to display information to an operator on a single CRT screen.

Another attribute of this invention is that additional controllers can be added with no additional logic on the base controller design. This allows the additional controllers to be added very easily as incremental features without increasing the cost of the base design.

We cliam:

1. In a system having a source of clock signals, a processor generating commands, an input/output device, and a first and second independently actuable controller for applying a counterpart first and second non-overlapping functionally distinct set of control signals to said device, each controller generating its counterpart set of control signals periodically conditioned by a processor command and in response to a predetermined number of clocking signals, wherein the improvement comprises means for synchronizing the controllers including:
   - gating means reponsive to processor command for applying clock signals selectively to said first and second controllers;
   - means for applying a subset of control signals from the first controller to the second controller as a timing reference; and
   - means responsive to the generation of the first and second set of control signals for selectively enabling or disabling the application of clocking signals to the controllers so as to enforce coincident generation of said first and second set of control signals.

2. In a system according to claim 1 in which the device is a cathode ray tube driven display, said first control unit regulating the characters displayed on said CRT and the second control unit regulating the color of said displayed characters.

* * * * *